United States Patent
Sasaki et al.

(10) Patent No.: US 8,021,749 B2
(45) Date of Patent: Sep. 20, 2011

(54) ARTICLE WITH ORGANIC-INORGANIC COMPOSITE FILM

(75) Inventors: Teruyuki Sasaki, Tokyo (JP); Kazutaka Kamitani, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 157 days.

(21) Appl. No.: 12/519,460

(22) PCT Filed: Dec. 17, 2007

(86) PCT No.: PCT/JP2007/074245
§ 371 (c)(1),
(2), (4) Date: Jun. 16, 2009

(87) PCT Pub. No.: WO2008/075650
PCT Pub. Date: Jun. 26, 2008

(65) Prior Publication Data
US 2010/0040890 A1    Feb. 18, 2010

(30) Foreign Application Priority Data
Dec. 20, 2006   (JP) ................................ 2006-342943

(51) Int. Cl.
*B32B 5/16* (2006.01)
*B32B 17/06* (2006.01)
(52) U.S. Cl. .................. 428/331; 428/323; 428/426
(58) Field of Classification Search .................. None
See application file for complete search history.

(56) References Cited

U.S. PATENT DOCUMENTS

| | | | |
|---|---|---|---|
| 5,349,002 A | 9/1994 | Patel | |
| 6,620,514 B1 * | 9/2003 | Arpac et al. | 428/447 |
| 6,855,396 B1 * | 2/2005 | Mennig et al. | 428/144 |
| 7,183,004 B2 | 2/2007 | Sonezaki et al. | |
| 7,749,606 B2 * | 7/2010 | Inoguchi et al. | 428/446 |
| 2007/0212571 A1 | 9/2007 | Inoguchi et al. | |

FOREIGN PATENT DOCUMENTS

| | | |
|---|---|---|
| JP | 6-256718 A | 9/1994 |
| JP | 11-140310 A | 5/1999 |
| JP | 11-143311 A | 5/1999 |
| JP | 2001-011376 A | 1/2001 |
| JP | 2006-188035 A | 7/2006 |
| WO | WO 2005/023946 A1 | 3/2005 |
| WO | WO 2005/095101 A1 | 10/2005 |

\* cited by examiner

*Primary Examiner* — Sheeba Ahmed
(74) *Attorney, Agent, or Firm* — Hamre, Schumann, Mueller & Larson, P.C.

(57) ABSTRACT

The present invention allows abrasion resistance in silica-based films containing an organic material to be improved. Such a silica-based film contains silica as an inorganic oxide to be its main component, and a poorly water-soluble polymer as an organic material. Example of the poorly water-soluble polymer include a polymer having a solubility of 1.0 g or less with respect to 100 g of water at 25° C., such as polycaprolactone polyol, bisphenol A polyol and glycerol polyol. The silica-based film exhibits good abrasion resistance not only in the Taber abrasion test, but also in the steel wool abrasion test.

7 Claims, No Drawings

ARTICLE WITH ORGANIC-INORGANIC COMPOSITE FILM

TECHNICAL FIELD

The present invention relates to an article with an organic-inorganic composite film having excellent abrasion resistance.

BACKGROUND ART

Generally, glass materials are hard and also can be used in the form of films that coat substrates. However, when employing a melting method, a high temperature treatment is necessary to obtain a glass film (silica-based film). This limits the material of which the substrates and coating films can be made.

The sol-gel process is a process of obtaining an oxide in a solid state by: using a solution of an organic or inorganic compound of metal as a starting material; rendering the solution into a sol in which fine particles of metal oxides or hydroxides have dissolved through the hydrolysis reaction and condensation polymerization reaction of the compound contained in the solution; further gelling and solidifying the sol; and heating this gel.

The sol-gel process allows silica-based films to be produced at lower temperatures. However, the silica-based films obtained by the sol-gel process have a problem of being inferior in mechanical strength, particularly the abrasion resistance of a film, compared to silica-based films obtained by the melting method. Recently, the inventors found that, by improving the sol-gel process, a silica-based film with excellent abrasion resistance can be formed, while containing an organic material, and suggested an article provided with this silica-based film (organic-inorganic composite film) in WO2005/095101A1. This silica-based film has excellent abrasion resistance comparable to a glass sheet obtained by the melting method in the Taber abrasion test.

This improved sol-gel process uses a coating solution with its pH adjusted to about 2 including more water than the theoretical amount, and further including added hydrophilic polymer represented by a polyether surfactant. This process allows a film of over 250 nm thickness with excellent abrasion resistance to be obtained, without heat treatment at high temperatures (e.g. over 400° C.). In this process, the hydrophilic polymer remains in the formed film while serving to prevent excess contraction of the film that can accompany the evaporation of fluid components of the coating solution.

Formation of organic-inorganic composite films by the sol-gel process is disclosed in JP11(1999)-140310A and also JP11(1999)-140311A, for example.

In JP11-140310A, "an organic-inorganic polymer hybrid where a sol-gel reaction of tetraalkoxysilane is carried out in the presence of amphipathic poly oxazoline block copolymer (7) containing a hydrophilic segment of poly(2-methyl oxazoline) and a hydrophobic segment of poly(2-phenyl oxazoline), and a block copolymer (7) is uniformly dispersed in a silica gel matrix" is suggested.

In JP11-140311A, "an organic-inorganic polymer hybrid where a non-reactive polymer having amide bond, urethane bond and/or urea bond, and a hydrophobic low molecular weight compound, being at least one selected from the group consisting of a condensation aromatic compound and an anthraquinone compound, are uniformly dispersed in a matrix of a metal oxide" is suggested.

DISCLOSURE OF THE INVENTION

The organic-inorganic composite film disclosed in WO2005/095101A1 exhibits a sufficient abrasion resistance in the Taber abrasion test that is carried out by pressing abrasive wheels. However, this organic-inorganic composite film still had room for improvement in its abrasion resistance with respect to a test such as the steel wool abrasion test in which the surface of a film is rubbed locally.

In order to increase the abrasion resistance of an organic-inorganic composite film in the steel wool abrasion test, it is important to remove fluid components rapidly in heating and drying the coating solution. The inventors accomplished the present invention in the light of this understanding.

The present invention provides an article with an organic-inorganic composite film, including a substrate and the organic-inorganic composite film formed on the surface of the substrate. The film includes an organic material and an inorganic oxide, the inorganic oxide being silica, and the silica being the main component of the organic-inorganic composite film, and the organic material being a poorly water-soluble polymer.

The present invention provides an article with an organic-inorganic composite film exhibiting good abrasion resistance not only in Taber abrasion test, but also in the steel wool abrasion test.

BEST MODE FOR CARRYING OUT THE INVENTION

The article with an organic-inorganic composite film of the present invention can be obtained by the following production process, for example. In this production process, an organic-inorganic composite film is formed on the surface of a substrate by the steps of applying a forming solution of the organic-inorganic composite film to the surface of the substrate, and removing the fluid components from the forming solution applied to the substrate. The forming solution may include silicon alkoxide, strong acid, water and an organic solvent, and further include a poorly water-soluble polymer. The silicon alkoxide has a concentration exceeding 3 mass % in terms of a $SiO_2$ concentration when silicon atoms contained in the silicon alkoxide are expressed as $SiO_2$, the strong acid has a concentration in the range of 0.001 to 0.2 mol/kg in terms of molar mass concentration of protons, assuming that the protons have dissociated completely from the strong acid, and the number of moles of the water is at least four times the total number of moles of the silicon atoms contained in the silicon alkoxide. In the application step, the forming solution is applied to the substrate, with the relative humidity in the atmosphere being less than 40%. In the removal step, the fluid components contained in the forming solution applied to the substrate are removed, with the substrate being at a temperature of 400° C. or lower.

According to the above-described production process, it is also possible to form an organic-inorganic composite film with a thickness exceeding 250 nm and still having excellent abrasion resistance through a single application of forming solution.

Examples of the poorly water-soluble polymer to be used in the present invention include a polymer with a solubility in 100 g of water at 25° C. (which may be simply referred to as "solubility" hereinafter) being 1.0 g or lower. Generally, polymers with such solubility often are treated as being "insoluble in water", however, the poorly water-soluble polymer to be used in the present invention is desired to be slightly soluble in water. This is because polymers with no water solubility cannot allow a transparent film to be obtained. A solubility of at least 0.01 g may be sufficient. In this regard, the solubility may be 0.5 g or lower. The poorly water-soluble polymer preferably is free from fluorine in order to avoid being excessively hydrophobic. Hydrophilic polymers such as polyether surfactants, polyethylene glycol, polypropylene glycol, polyvinyl pyrrolidone have a solubility exceeding 1.0 g by far.

The poorly water-soluble polymer preferably includes a carbonyl group, and more preferably includes a carbonyl group in the repeating unit of the polymer. The poorly water-soluble polymer preferably includes an alkylene oxide group or a carbonyl alkylene oxide group, and more preferably includes an alkylene oxide group or a carbonyl alkylene oxide group in the repeating unit of the polymer. The alkylene oxide group or carbonyl alkylene oxide group may include an alkylene group having a carbon number of 3 or more, like a propylene oxide group or carbonyl propylene oxide group. The poorly water-soluble polymer may have a benzene ring. Benzene rings decrease the water solubility of polymers. These functional groups, especially benzene rings and carbonyl groups, have the possibility of contributing to an increase of the strength of films.

Examples of the poorly water-soluble polymer include polycaprolactone polyol; polyesters such as 3-methyl-1,5-pentan diol/adipic acid copolymer, 3-methyl-1,6-pentan diol/adipic acid copolymer, 3-methyl-1,5-pentan diol/terephthalic acid copolymer, 3-methyl-1,5-pentan diol/adipic acid/trimethylolpropane copolymer, 3-methyl-1,6-pentan diol/adipic acid/trimethylolpropane copolymer, 1,9-nonanediol/adipic acid copolymer; polycarbonate diol that is a diol having a carbonate ester bond (—O—R—O—CO—) in its main chain; bisphenol A polyol; and glycerol polyol.

Although the hydroxyl value of a polymer does not indicate the degree of the water solubility directly, it can be an indicator of the water solubility concerning polymers with a similar structure. When using polyol that does not have a benzene ring or carbonyl group, for example, the hydroxyl value is preferably in a range of 150 mg KOH/g or lower, 100 mg KOH/g or lower, more preferably 70 mg KOH/g or lower. The minimum of hydroxyl value may be, for example, 5 mg KOH/g.

The poorly water-soluble polymer may be at least one kind of polymer selected from polycaprolactone polyol, bisphenol A polyol, and glycerol polyol.

Examples of the polycaprolactone polyol include triol and diol having the structure derived from ε-caprolactone in the molecules and expressed by Formula 1 below as a repeating unit.

[Formula 1]

(1)

Examples of the bisphenol A polyol include an alkylene oxide adduct of bisphenol A represented by the compound expressed by Formula 2 below. Examples of the alkylene oxide include an ethylene oxide, a propylene oxide, and the block polymers and random polymers thereof.

[Formula 2]

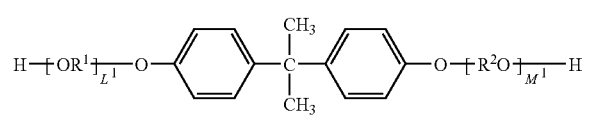
(2)

Here, $R^1$ and $R^2$ are a linear or branched alkylene group having a carbon number of 1 to 10, and $L^1$ and $M^1$ are an integer of 1 to 30.

Examples of the glycerol polyol include an alkylene oxide adduct of glycerol represented by a compound described by Formula 3 below. Examples of the alkylene oxide include an ethylene oxide, a propylene oxide, and the block polymers and random polymers thereof.

[Formula 3]

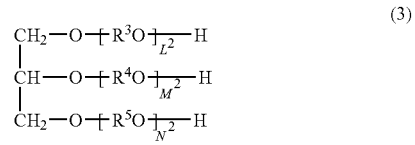
(3)

Here, $R^3$, $R^4$ and $R^5$ are a linear or branched alkylene group having a carbon number of 1 to 10, and $L^2$, $M^2$ and $N^2$ are an integer of 1 to 30, preferably 5 to 30.

The poorly water-soluble polymer may include electron-withdrawing substituents such as a carboxyl group, an amino group, and a nitro group.

When the forming solution has its pH adjusted to about 2 including more water than the theoretical amount and additionally having a polymer, an organic-inorganic composite film having excellent abrasion resistance in the Taber abrasion test can be formed, even if the film thickness exceeds 250 nm. This durability also may be achieved when the main polymer to be added to the forming solution is a poorly water-soluble polymer represented by polycaprolactone polyol, or a hydrophilic polymer represented by polyether surfactants.

However, when a hydrophilic polymer is used as the main polymer to be added to the forming solution, good abrasion resistance cannot be obtained in the steel wool abrasion test, as described above. Alcohol and water mainly are used as a solvent for the forming solution. The polymers that are difficult to dissolve in water are often difficult to dissolve in alcohol as well. Therefore, poorly water-soluble polymers have not been given much attention so far as a main polymer to be added to forming solution. However, in order to ensure good abrasion resistance in the steel wool abrasion test, it is important to select a poorly water-soluble polymer as the main polymer to be added to the forming solution. When the "main" polymer is a poorly water-soluble polymer, it means that the ratio of the poorly water-soluble polymer to the total mass of the polymer to be added to the forming solution exceeds 50%.

It has not been clear so far why the abrasion resistance of a film can be further improved by selecting a poorly water-soluble polymer as the main polymer to be added to the forming solution, however, the inventors consider as follows.

Since the polymer in the forming solution is hard to decompose at a low temperature of 400° C. or lower, it remains in the film through the step of removing the fluid components included in the forming solution applied to the substrate (removal step). In order to improve the abrasion resistance of a film, it is important to remove fluid components rapidly so as to form a denser film in the removal step. Since the forming solution includes excess water, especially water is required to be removed rapidly among the fluid components. It seems that poorly water-soluble polymers serve to facilitate the removal of fluid components in the removal step, while hydrophilic polymers serve to keep water in a film due to the high compatibility with water. It can be considered, therefore, that rapid removal of fluid components in the removal step becomes easier, due to use of the forming solution having a poorly water-soluble polymer as its main polymer, so that a denser film can be formed.

According to the improved sol-gel process described above, an organic-inorganic composite film that exhibits good abrasion resistance even in the steel wool abrasion test can be formed.

Abrasion resistance of an organic-inorganic composite film of the present invention is excellent to the extent that, after the steel wool abrasion test where No. 0000 steel wool is pressed to the surface of the film with a load of 0.25 kg/cm$^2$ and caused to reciprocate 10 times, scratches cannot be detected by visual inspection on the test portion.

Scratches in the film after the steel wool abrasion test can be detected as follows. Whether scratches have occurred can be determined by presence or absence of diffused reflection light along the streaks in the direction of the abrasion, when the sample after the test is observed and inspected visually from various directions under normal fluorescent light (about 1400 lux, for example).

The following is a reason why the assessment in the steel wool abrasion test is carried out depending on presence or absence of scratches detected by visual inspection. That is because an organic-inorganic composite film of the present invention has such excellent resistance against local abrasion that, even if the haze ratios before and after the steel wool abrasion test are measured, for example, the difference therebetween cannot be detected. Thus, the abrasion resistance cannot be assessed properly. The steel wool abrasion test is a more severe abrasion test for the organic-inorganic composite film of the present invention, compared to an assessment method such as the Taber abrasion test where the sample is abraded by the surface with respect to a predetermined area, because it is abraded by steel wool fibers, each being in local contact. A specific method for the steel wool abrasion test will be described later in detail.

The organic-inorganic composite film of the present invention allows the abrasion resistance of the organic-inorganic composite film to be improved to an extent that, even if the test should be carried out by setting the load and the number of reciprocations in the steel wool abrasion test respectively to, 0.5 kg/cm$^2$ and 10 reciprocations, 0.75 kg/cm$^2$ and 10 reciprocations, 1 kg/cm$^2$ and 10 reciprocations, and 1 kg/cm$^2$ and 50 reciprocations, no scratches could be detected by visual inspection in the test portion.

This film does not separate from the substrate after the Taber abrasion test prescribed in Japanese Industrial Standards (JIS) R 3212. Further, the present invention also allows a portion that has been subjected to the Taber abrasion test to have a haze ratio of 4% or lower, further 3% or lower after the Taber abrasion test. JIS R 3212 compliant Taber abrasion test can be carried out, using a commercially available Taber abrasion tester. This test is an abrasion test that is carried out at a rotation number of 1000, with a load of 500 g being applied, as prescribed in the JIS.

In the organic-inorganic composite film of the present invention, the content of the organic material represented by a poorly water-soluble polymer is in a range of 0.1 to 60%, preferably 2 to 60%, more particularly 10 to 40%, with respect to the total mass of the organic-inorganic composite film. The organic-inorganic composite film may contain a hydrophilic polymer as an additional organic material, as long as good abrasion resistance can be achieved in the steel wool abrasion test.

The thickness of the organic-inorganic composite film is more than 250 nm but not more than 10 μm, preferably more than 300 nm but not more than 10 μm, more preferably 500 nm to 10 μm. The film thickness may be 1 μm or more, further more than 1 μm, and 5 μm or less.

Examples of the transparent substrate include a glass sheet or a plastic plate. Using a transparent substrate with a thickness exceeding 0.1 mm, particularly 0.3 mm or more, more particularly 0.5 mm or more ensures the prevention of cracking or film separation after the Taber abrasion test. The upper limit of the substrate thickness may be, but is not restricted to, 20 mm or less, particularly 10 mm or less.

It is preferable that the number of moles of water in the forming solution be over 4 times, for example 5 times to 20 times the total number of moles of the silicon atoms.

The concentration of silicon alkoxide in the forming solution is desirably in a range exceeding 3 mass % to 30 mass %, preferably in a range exceeding 3 mass % to less than 13 mass %, and more preferably in a range exceeding 3 mass % to 9 mass %. A high concentration of silicon alkoxide in the forming solution may cause a crack in the film, resulting in the separation of the film from the substrate.

Examples of the strong acid include hydrochloric acid, nitric acid, trichloroacetic acid, trifluoroacetic acid, sulfuric acid, phosphoric acid, methanesulfonic acid, p-toluenesulfonate, and oxalic acid. Among strong acids, volatile acids represented by hydrochloric acid can be used advantageously since they volatilize during heating and thus do not remain in the film that has been cured. Acid remaining in the cured film may deteriorate the film hardness.

Examples of the organic solvent include methyl alcohol, ethyl alcohol, 1-propyl alcohol, isopropyl alcohol, t-butyl alcohol, methyl cellosolve, ethyl cellosolve, isobutyl alcohol, propylene glycol monomethyl ether, propylene glycol monoethyl ether, and diacetone alcohol.

It is desirable to maintain an atmosphere at the relative humidity less than 40% when applying the forming solution on the substrate in the application step. When the relative humidity is controlled to be less than 40%, particularly 30% or less, absorption of excess moisture in the atmosphere can be prevented, thereby allowing a film having a dense structure to be formed. The lower limit of the relative humidity may be, but is not restricted to, preferably 15%, more particularly 20%, in view of improving the handling properties of the forming solution (e.g. coating property).

Fluid components, such as water and organic solvent, in the forming solution applied on the substrate are removed in the removal step. More specifically, at least part of, more preferably substantially all of, the water and the organic solvent are removed. The removal step may include an air-drying step at room temperature (25° C.) followed by a heat-treatment step under an atmosphere at higher temperature than room temperature, but not higher than 400° C., for example, in a range of 100° C. to 300° C., more particularly, to 250° C. It is preferable to carry out the air-drying step under an atmosphere with the relative humidity controlled to less than 40%, more particularly 30% or less. Controlling the relative humidity to the above-described range prevents the occurrence of cracks in the film. The lower limit of the relative humidity may be, but is not restricted to, 15%, more particularly 20%.

The concentration of the poorly water-soluble polymer in the forming solution may be 60 mass % or less with respect to the SiO$_2$ concentration when the silicon atoms contained in the silicon alkoxide are expressed as the SiO$_2$. The lower limit of the concentration of the poorly water-soluble polymer may be preferably 0.1 mass % or more, particularly 5 mass % or more, with respect to the SiO$_2$.

EXAMPLE

Hereafter, the present invention is described in detail by way of examples.

Example A1

In Example A1, a film was formed by using the forming solution having polycaprolactone polyol as a poorly water-soluble polymer.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Placcel 303 has a solubility in a range of 1.0 g or less with respect to 100 g of water at 25° C. The contents of the poorly water-soluble polymer, silicon alkoxide (in terms of silica), proton concentration, and water in this solution are indicated in Table 1.

The content of water was calculated to include water (0.35 mass %) contained in the ethyl alcohol. The proton concentration was calculated assuming that all the protons contained in the hydrochloric acid had dissociated. The same methods of calculating the water content and proton concentration as those described above are employed in all the Examples and Comparative Examples described below.

Subsequently, the forming solution was applied to a soda-lime-silicate glass substrate (100×100 mm, 3.1 mm thick) that had been washed, with a relative humidity (hereinafter simply referred to as "humidity") of 30% at room temperature by flow coating. The forming solution applied thereto was air dried at room temperature for about 5 minutes. Thereafter, it was placed in an oven whose temperature had been raised to 200° C. beforehand and then was heated for 15 minutes. After that, it was cooled, thereby allowing a film to be formed on the glass substrate.

The film thus obtained had high transparency and was free from cracks. No film separation was observed after the Taber abrasion test, either. Further, it had excellent durability with respect to the steel wool abrasion test. The thickness of the film, haze ratios thereof before and after the Taber abrasion test, and presence or absence of scratches after the steel wool abrasion test are indicated in Table 2.

Abrasion tester (Heidon Tribostation Type 32, manufactured by Shinto Scientific Co., Ltd.) and No. 0000 steel wool were used in the steel wool abrasion test. The steel wool was pressed to the surface of the film with a load of 0.25 to 1.0 kg/cm$^2$ being applied and caused to reciprocate 10 to 50 times. The steel wool was attached to the head of the abrasion tester. The size of the portion of the head in contact with the film to be tested was 20×20 mm. The steel wool with a size of 125×20 mm and a thickness of 2 mm to 3 mm was attached to the head via flannel cloth of 125×20 mm. The weight of the steel wool was about 0.2 g, when it is a size of 20×20 mm and a thickness of 2 mm to 3 mm. The abrasion tester was set such that the head moves at a speed of 7200 mm/minute across the distance of 50 mm. Presence or absence of scratches in the tested film was detected by visual inspection under conventional fluorescent light of about 1400 lux.

The Taber abrasion test was carried out as prescribed in JIS R 3212. A commercially available Taber abrasion tester (5150 ABRASER, manufactured by TABER INDUSTRIES) was used, and the film was subjected to abrasion 1000 times with a load of 500 g being applied. The haze ratio was measured by using HZ-1S, manufactured by Suga Test Instruments Co., Ltd.

Example A2

In Example A2, a film was formed in a similar manner to Example A1 except that the temperature in the oven was 130° C., and the film was kept in the oven for 30 minutes. The film thus obtained had high transparency and was free from cracks. Table 2 indicates various characteristics of the film thus obtained.

Example A3

In Example A3, a film was formed in a similar manner to Example A1 except that the forming solution having an increased amount of the poorly water-soluble polymer was used.

27.20 g of pure water, 20.46 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 7.15 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Table 1 indicates the concentration of each component in this solution.

The film thus obtained had high transparency and was free from cracks. Table 2 indicates various characteristics of the film thus obtained.

Example A4

In Example A4, a film was formed in a similar manner to Example A3 except that the temperature in the oven was 130° C., and the film was kept in the oven for 30 minutes. The film thus obtained had high transparency and was free from cracks. Table 2 indicates various characteristics of the film thus obtained.

Example A5

In Example A5, a film was formed in a similar manner to Example A1 except that the forming solution having bisphenol A polyol in place of polycaprolactone polyol as a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of bisphenol A propylene oxide adduct (BPX-55, manufactured by ADEKA CORPORATION), and 45.14 g of tetraethoxysilane (manufactured by Shin-Etsu Chemical Co., Ltd.) were mixed and stirred for four hours, thereby allowing the forming solution to be obtained. BPX-55, manufactured by ADEKA CORPORATION, has a solubility in a range of 1.0 g or less with respect to 100 g of water at 25° C. Table 1 indicates the concentration of each component in this solution.

The film thus obtained had high transparency and was free from cracks. Table 2 indicates various characteristics of the film thus obtained.

Example A6

In Example A6, a film was formed in a similar manner to Example A5 except that the temperature in the oven was 130°

C., and the film was kept in the oven for 30 minutes. The film thus obtained had high transparency and was free from cracks. Table 2 indicates various characteristics of the film thus obtained.

Example A7

In Example A7, a film was formed in a similar manner to Example A5 except that the forming solution having an increased amount of the poorly water-soluble polymer was used.

27.20 g of pure water, 20.46 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 7.15 g of bisphenol A propylene oxide adduct (BPX-55, manufactured by ADEKA CORPORATION), and 45.14 g of tetraethoxysilane (manufactured by Shin-Etsu Chemical Co., Ltd.) were mixed and stirred for four hours, thereby allowing the forming solution to be obtained. Table 1 indicates the concentration of each component in this solution.

The film thus obtained had high transparency and was free from cracks. Table 2 indicates various characteristics of the film thus obtained.

Example A8

In Example A8, a film was formed in a similar manner to Example A1 except that the forming solution having glycerol polyol in place of polycaprolactone polyol as a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of glycerol propylene oxide adduct (G-3000B, manufactured by ADEKA CORPORATION), and 45.14 g of tetraethoxysilane (manufactured by Shin-Etsu Chemical Co., Ltd.) were mixed and stirred for four hours, thereby allowing the forming solution to be obtained. G-3000B, manufactured by ADEKA CORPORATION, has a solubility in a range of 1.0 g or less with respect to 100 g of water at 25° C. Table 1 indicates the concentration of each component in this solution.

The film thus obtained had high transparency and was free from cracks. Table 2 indicates various characteristics of the film thus obtained.

Example A9

In Example A9, a film was formed in a similar manner to Example A8 except that the forming solution having another sample of glycerol polyol as a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of glycerol propylene oxide adduct (G-4000, manufactured by ADEKA CORPORATION), and 45.14 g of tetraethoxysilane (manufactured by Shin-Etsu Chemical Co., Ltd.) were mixed and stirred for four hours, thereby allowing the forming solution to be obtained. G-4000, manufactured by ADEKA CORPORATION, has a solubility in a range of 1.0 g or less with respect to 100 g of water at 25° C. Table 1 indicates the concentration of each component in this solution.

The film thus obtained had high transparency and was free from cracks. Table 2 indicates various characteristics of the film thus obtained.

Comparative Example A1

In Comparative Example A1, a film was formed in a similar manner to Example A2 except that the forming solution having a hydrophilic polymer in place of a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of polyether phosphate ester surfactant (SOLSPERSE 41000, manufactured by Lubrizol Japan Ltd.), and 45.14 g of tetraethoxysilane (manufactured by Shin-Etsu Chemical Co., Ltd.) were mixed and stirred for four hours, thereby allowing the forming solution to be obtained. SOLSPERSE 41000, manufactured by Lubrizol Japan Ltd., is a polymer where polyoxyethylene alkyl ether is esterified with phosphoric acid, having a solubility in a range exceeding 1.0 g with respect to 100 g of water at 25° C. Table 5 indicates the concentration of each component in this solution.

The film thus obtained had high transparency and was free from cracks. Table 6 indicates various characteristics of the film thus obtained.

Comparative Example A2

In Comparative Example A2, a film was formed in a similar manner to Comparative Example A1 except that the forming solution having an increased amount of the hydrophilic polymer was used.

27.20 g of pure water, 20.46 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 7.15 g of polyether phosphate ester surfactant (SOLSPERSE 41000, manufactured by Lubrizol Japan Ltd.), and 45.14 g of tetraethoxysilane (manufactured by Shin-Etsu Chemical Co., Ltd.) were mixed and stirred for four hours, thereby allowing the forming solution to be obtained. Table 5 indicates the concentration of each component in this solution.

The film thus obtained had high transparency and was free from cracks. Table 6 indicates various characteristics of the film thus obtained.

Example B1

In Example B1, a film was formed by using a polycarbonate substrate formed with a primer layer as a substrate and by using the forming solution having polycaprolactone polyol as a poorly water-soluble polymer.

First, 97.992 g of ethyl alcohol (manufactured by KATAYAMA CHEMICAL INDUSTRIES Co., Ltd.), 2.008 g of aminopropyl triethoxysilane (manufactured by Shin-Etsu Chemical Co., Ltd.) were mixed and stirred, thereby allowing the forming solution to be obtained. The content of 3-aminopropyl triethoxysilane in this solution (in terms of 3-aminopropyl silsesquioxane ($RSiO_{1.5}$)) was 1 mass %, and the content of water (to the amount of Si; molar ratio) was 2.4. The content of water was calculated to include 0.35 mass % of water contained in the ethyl alcohol. Subsequently, the forming solution was applied to a polycarbonate substrate (100× 100 mm, 3.0 mm thick) that had been washed, with a humidity of 30% at room temperature by flow coating. It was dried at room temperature for about 5 minutes. Thereafter, it was placed in an oven whose temperature had been raised to 110° C. beforehand and then was heated for 30 minutes. After that, it was cooled, thereby allowing a polycarbonate substrate formed with a primer layer to be obtained.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

Next, the forming solution was applied onto the primer layer with humidity 30% at room temperature by flow coating. The forming solution applied thereto was air dried at room temperature for about 5 minutes. Thereafter, it was placed in an oven whose temperature had been raised to 130° C. beforehand and then was heated for 60 minutes. After that, it was cooled, thereby allowing a film to be formed on the substrate.

The film thus obtained had high transparency and was free from cracks. Table 4 indicates various characteristics of the film thus obtained. The film thickness was measured by forming a film on the soda-lime-silicate glass substrate in place of the polycarbonate substrate formed with the primer layer, for convenience.

Example B2

In Example B2, a film was formed in a similar manner to Example B1 except that the forming solution having an increased amount of the poorly water-soluble polymer was used.

27.20 g of pure water, 20.46 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 7.15 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

The film thus obtained had high transparency and was free from cracks. Table 4 indicates various characteristics of the film thus obtained.

Example B3

In Example B3, a film was formed in a similar manner to Example B1 except that the forming solution having an increased amount of the poorly water-soluble polymer was used.

27.20 g of pure water, 19.81 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 7.80 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

The film thus obtained had high transparency and was free from cracks. Table 4 indicates various characteristics of the film thus obtained.

Example B4

In Example B4, a film was formed in a similar manner to Example B3 except that the forming solution with increased proton concentration was used.

27.20 g of pure water, 19.76 g of ethyl alcohol (manufactured by KATAYAMA CHEMICAL INDUSTRIES Co., Ltd.), 0.10 g of concentrated hydrochloric acid (35 mass %, manufactured by KANTO CHEMICAL CO., INC.), 7.80 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

The film thus obtained had high transparency and was free from cracks. Table 4 indicates various characteristics of the film thus obtained.

Example B5

In Example B5, a film was formed in a similar manner to Example B3 except that the forming solution with increased proton concentration was used.

27.20 g of pure water, 19.76 g of ethyl alcohol (manufactured by KATAYAMA CHEMICAL INDUSTRIES Co., Ltd.), 0.10 g of concentrated hydrochloric acid (35 mass %, manufactured by KANTO CHEMICAL CO., INC.), 7.80 g of polycaprolactone triol (Placcel 303, manufactured by DAICEL CHEMICAL INDUSTRIES, LTD.), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

The film thus obtained had high transparency and was free from cracks. Table 4 indicates various characteristics of the film thus obtained.

Example B6

In Example B6, a film was formed in a similar manner to Example B1 except that the forming solution having bisphenol A polyol in place of polycaprolactone polyol as a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of bisphenol A propylene oxide adduct (BPX-55, manufactured by ADEKA CORPORATION), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

The film thus obtained had high transparency and was free from cracks. Table 4 indicates various characteristics of the film thus obtained.

Example B7

In Example B7, a film was formed in a similar manner to Example B6 except that the forming solution having another sample of bisphenol A polyol was used and the film was kept in the oven for 30 minutes for curing of the forming solution applied to the substrate.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of bisphenol A propylene oxide adduct (manufactured by ADEKA CORPORATION, BPX-2000), and 45.14 g of tetraethoxysilane (manufactured by Shin-Etsu Chemical Co., Ltd.) were mixed and stirred for four hours, thereby allowing the forming solution to be obtained. BPX-2000, manufactured by ADEKA CORPORATION, has a solubility in a range of 1.0 g or less with respect to 100 g of water at 25° C. Table 3 indicates the concentration of each component in this solution.

The film thus obtained had high transparency and was free from cracks. Table 4 indicates various characteristics of the film thus obtained.

Example B7

In Example B7, a film was formed in a similar manner to Example B6 except that the forming solution having glycerol polyol in place of bisphenol A polyol as a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of glycerol propylene oxide adduct (G-3000B, manufactured by ADEKA CORPORATION), and 45.14 g of tetraethoxysilane (manufactured by Shin-Etsu Chemical Co., Ltd.) were mixed and stirred for four hours, thereby allowing the forming solution to be obtained. Table 3 indicates the concentration of each component in this solution.

The film thus obtained had high transparency and was free from cracks. Table 4 indicates various characteristics of the film thus obtained.

Comparative Example B1

In Comparative Example B1, a film was formed in a similar manner to Example B1 except that the forming solution having a hydrophilic polymer in place of a poorly water-soluble polymer was used.

27.20 g of pure water, 22.41 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 5.20 g of polyether phosphate ester surfactant (SOLSPERSE 41000, manufactured by Lubrizol Japan Ltd.), and 45.14 g of tetraethoxysilane (manufactured by Shin-Etsu Chemical Co., Ltd.) were mixed and stirred for four hours, thereby allowing the forming solution to be obtained. Table 5 indicates the concentration of each component in this solution.

The film thus obtained had high transparency and was free from cracks. Table 6 indicates various characteristics of the film thus obtained.

Comparative Example B2

In Comparative Example B2, a film was formed in a similar manner to Comparative Example B1 except that the forming solution having an increased amount of a hydrophilic polymer was used.

27.20 g of pure water, 20.46 g of ethyl alcohol (manufactured by KATAYAMA CHEMICAL INDUSTRIES Co., Ltd.), 0.05 g of concentrated hydrochloric acid (35 mass %, manufactured by KANTO CHEMICAL CO., INC.), 7.15 g of polyether phosphate ester surfactant (SOLSPERSE 41000, manufactured by Lubrizol Japan Ltd.), and 45.14 g of tetraethoxysilane (manufactured by Shin-Etsu Chemical Co., Ltd.) were mixed and stirred for four hours, thereby allowing the forming solution to be obtained. Table 5 indicates the concentration of each component in this solution.

The film thus obtained had high transparency and was free from cracks. Table 6 indicates various characteristics of the film thus obtained.

TABLE 1

|  |  | POORLY WATER-SOLUBLE POLYMER | | | HEATING CONDITION | |
|---|---|---|---|---|---|---|
|  | VARIETY | RATIO TO $SiO_2$ AMOUNT (mass %) | RATIO TO SOLUTION (mass %) | RATIO TO FILM (mass %) | TEMPERATURE (° C.) | TIME (min.) |
| EXAMPLE A1 | POLYCAPROLACTONE TRIOL | 40.0 | 5.2 | 28.6 | 200 | 15 |
| EXAMPLE A2 |  | 40.0 | 5.2 | 28.6 | 130 | 30 |
| EXAMPLE A3 |  | 55.0 | 7.2 | 35.5 | 200 | 15 |
| EXAMPLE A4 |  | 55.0 | 7.2 | 35.5 | 130 | 30 |
| EXAMPLE A5 | BISPHENOL A DIOL | 40.0 | 5.2 | 28.6 | 200 | 15 |
| EXAMPLE A6 |  | 40.0 | 5.2 | 28.6 | 130 | 30 |
| EXAMPLE A7 |  | 55.0 | 7.2 | 35.5 | 200 | 15 |
| EXAMPLE A8 | GLYCEROL TRIOL | 40.0 | 5.2 | 28.6 | 200 | 15 |
| EXAMPLE A9 | GLYCEROL TRIOL | 40.0 | 5.2 | 28.6 | 200 | 15 |

Silicon alkoxide concentration is 13.0 mass % in all cases (in terms of SiO2)
Proton concentration is 0.005 mol/kg in all cases
Water amount (ratio to Si amount; molar ratio) is 7.0 in all cases

TABLE 2

| | FILM THICKNESS (nm) | HAZE RATIO (%) INITIAL VALUE | HAZE RATIO (%) AFTER TABER TEST | SCRATCHES AFTER STEEL WOOL TEST 0.25 kg/cm² 10 times | 0.50 kg/cm² 10 times | 0.75 kg/cm² 10 times | 1.00 kg/cm² 10 times | 1.00 kg/cm² 50 times |
|---|---|---|---|---|---|---|---|---|
| EXAMPLE A1 | 3000 | 0.1 | 0.7 | NONE | NONE | NONE | NONE | NONE |
| EXAMPLE A2 | 3500 | 0.2 | 1.0 | NONE | NONE | NONE | NONE | NONE |
| EXAMPLE A3 | 3500 | 0.2 | 1.0 | NONE | NONE | NONE | NONE | NONE |
| EXAMPLE A4 | 4000 | 0.3 | 1.5 | NONE | NONE | NONE | NONE | NONE |
| EXAMPLE A5 | 3500 | 0.2 | 1.4 | NONE | NONE | NONE | NONE | DETECTED |
| EXAMPLE A6 | 4000 | 0.2 | 2.1 | NONE | NONE | NONE | NONE | DETECTED |
| EXAMPLE A7 | 4000 | 0.7 | 2.0 | NONE | NONE | NONE | DETECTED | DETECTED |
| EXAMPLE A8 | 3000 | 0.6 | 1.7 | NONE | NONE | NONE | NONE | NONE |
| EXAMPLE A9 | 3000 | 0.1 | 1.2 | NONE | NONE | NONE | NONE | NONE |

No film separation observed after the Taber test in all cases

TABLE 3

| | POORLY WATER-SOLUBLE POLYMER VARIETY | RATIO TO $SiO_2$ AMOUNT (mass %) | RATIO TO SOLUTION (mass %) | RATIO TO FILM (mass %) | HEATING CONDITION TEMPERATURE (°C.) | HEATING CONDITION TIME (min.) |
|---|---|---|---|---|---|---|
| EXAMPLE B1 | POLYCAPROLACTONE TRIOL | 40.0 | 5.2 | 28.6 | 130 | 60 |
| EXAMPLE B2 | | 55.0 | 7.2 | 35.5 | 130 | 60 |
| EXAMPLE B3 | | 60.0 | 7.8 | 37.5 | 130 | 60 |
| EXAMPLE B4 | | 60.0 | 7.8 | 37.5 | 130 | 60 |
| EXAMPLE B5 | BISPHENOL A DIOL | 40.0 | 5.2 | 28.6 | 130 | 60 |
| EXAMPLE B6 | | 40.0 | 5.2 | 28.6 | 130 | 30 |
| EXAMPLE B7 | GLYCEROL TRIOL | 40.0 | 5.2 | 28.6 | 130 | 30 |

Silicon alkoxide concentration is 13.0 mass % in all cases (in terms of $SiO_2$)
Proton concentration is 0.010 mol/kg in EXAMPLE B4 and 0.005 mol/kg in other cases
Water amount (ratio to Si amount; molar ratio) is 7.0 in all cases

TABLE 4

| | HAZE RATIO (%) INITIAL VALUE | HAZE RATIO (%) AFTER TABER TEST | SCRATCHES AFTER STEEL WOOL TEST 0.25 kg/cm² 10 times | 0.50 kg/cm² 10 times | 0.75 kg/cm² 10 times | 1.00 kg/cm² 10 times | 1.00 kg/cm² 50 times |
|---|---|---|---|---|---|---|---|
| EXAMPLE B1 | 0.5 | 1.3 | NONE | NONE | NONE | NONE | NONE |
| EXAMPLE B2 | 0.2 | 1.4 | NONE | NONE | NONE | NONE | NONE |
| EXAMPLE B3 | 0.2 | 2.0 | NONE | NONE | NONE | — | — |
| EXAMPLE B4 | 0.3 | 2.2 | NONE | NONE | NONE | — | — |

TABLE 4-continued

| | HAZE RATIO (%) | | SCRATCHES AFTER STEEL WOOL TEST | | | | |
|---|---|---|---|---|---|---|---|
| | INITIAL VALUE | AFTER TABER TEST | 0.25 kg/cm² 10 times | 0.50 kg/cm² 10 times | 0.75 kg/cm² 10 times | 1.00 kg/cm² 10 times | 1.00 kg/cm² 50 times |
| EXAMPLE B5 | 0.6 | 2.3 | NONE | NONE | NONE | NONE | NONE |
| EXAMPLE B6 | 0.6 | 3.1 | NONE | NONE | NONE | NONE | DETECTED |
| EXAMPLE B7 | 0.6 | 2.8 | NONE | NONE | NONE | NONE | NONE |

No film separation observed after the Taber test in all cases
Film thickness is 3000 nm or more in all cases

TABLE 5

| | HYDROPHILIC POLYMER | | | HEATING CONDITION | |
|---|---|---|---|---|---|
| | RATIO TO SiO₂ AMOUNT (mass %) | RATIO TO SOLUTION (mass %) | RATIO TO FILM (mass %) | TEMPERATURE (° C.) | TIME (min.) |
| COMPARATIVE EXAMPLE A1 | 40.0 | 5.2 | 28.6 | 130 | 30 |
| COMPARATIVE EXAMPLE A2 | 55.0 | 7.2 | 35.5 | 130 | 30 |
| COMPARATIVE EXAMPLE B1 | 40.0 | 5.2 | 28.6 | 130 | 60 |
| COMPARATIVE EXAMPLE B2 | 55.0 | 7.2 | 35.5 | 130 | 60 |

Silicon alkoxide concentration is 13.0 mass % in all cases (in terms of SiO2)
Proton concentration is 0.005 mol/kg in all cases
Water amount (ratio to Si amount; molar ratio) is 7.0 in all cases

TABLE 6

| | HAZE RATIO (%) | | SCRATCHES AFTER STEEL WOOL TEST | | | | |
|---|---|---|---|---|---|---|---|
| | INITIAL VALUE | AFTER TABER TEST | 0.25 kg/cm² 10 times | 0.50 kg/cm² 10 times | 0.75 kg/cm² 10 times | 1.00 kg/cm² 10 times | 1.00 kg/cm² 50 times |
| COMPARATIVE EXAMPLE A1 | 0.3 | 3.5 | DETECTED | DETECTED | DETECTED | DETECTED | DETECTED |
| COMPARATIVE EXAMPLE A2 | 0.4 | 7.1 | DETECTED | DETECTED | DETECTED | DETECTED | DETECTED |
| COMPARATIVE EXAMPLE B1 | 0.5 | 3.4 | DETECTED | DETECTED | DETECTED | DETECTED | DETECTED |
| COMPARATIVE EXAMPLE B2 | 0.7 | 2.2 | DETECTED | DETECTED | DETECTED | DETECTED | DETECTED |

No film separation observed after the Taber test in all cases

The Examples and Comparative Examples described above are to be considered in all respects as illustrative and not limiting the present invention.

Fluorine resin-fine particles would be added to a silica-based film in some cases for the purpose of improving the abrasion resistance. However, an organic-inorganic composite film of the present invention has preferable abrasion resistance, as shown in Examples, in spite of being free from fluorine resin-fine particles. As described above, an organic-inorganic composite film of the present invention may be free from fluorine resin-fine particles. Note that "being free from fluorine resin-fine particles" is not intended to exclude the case where a lower amount of fluorine resin-fine particles than the amount required to be added for providing a function is incorporated in the film.

An organic-inorganic composite film of the present invention may be free from fluorine resin-fine particles, and may include other fine particles. Examples of the fine particles include electrically conductive oxide fine particles or fluorine-free resin fine particles represented by indium tin oxide fine particles and antimony tin oxide fine particles. The amount of fine particles to be added may be adjusted appropriately corresponding to functions to be provided in the film. When adding electrically conductive oxide fine particles, it may be 1 mass % or more, for example.

An organically modified metal alkoxide may be added to the forming solution of the organic-inorganic composite film so that the number of moles of the metal atoms in the metal alkoxide is 10% or less of the number of moles of the silicon atoms in the silicon alkoxide that is not organically modified. Metal oxides other than Si may be added in a range not exceeding the mass fraction of the silicon oxide, so as to be a composite oxide.

The forming solution may contain metal compounds that can be dissolved in water or an organic solvent, specifically ionized and dissolved simply. Examples of the metal compound include chlorides, oxides and nitrate salts of metals, such as lithium, sodium, potassium, cesium, magnesium, calcium, cobalt, iron, nickel, copper, aluminum, gallium, indium, scandium, yttrium, lanthanum, cerium and zinc. Boron, titanium, zirconium and aluminum may be added.

INDUSTRIAL APPLICABILITY

The present invention provides an article with a silica-based film having excellent abrasion resistance while containing an organic material. It would be of great use in various fields where particular abrasion resistance of a coating film is required.

The invention claimed is:

1. An article with an organic-inorganic composite film, the article comprising:
   a substrate; and
   an organic-inorganic composite film that is formed on a surface of the substrate and contains an organic material and an inorganic oxide, wherein
   the organic-inorganic composite film contains silica as the inorganic oxide,
   the organic-inorganic composite film contains the silica as its main component,
   the organic-inorganic composite film contains a poorly water-soluble polymer as the organic material,
   scratches cannot be detected by visual inspection on a test portion after a steel wool abrasion test that is carried out by using No. 0000 steel wool pressed to the surface of the organic-inorganic composite film with a load of 0.25 $kg/cm^2$ being applied, and caused to reciprocate 10 times, and
   the poorly water-soluble polymer includes at least one selected from polycaprolactone polyol, bisphenol A polyol and glycerol polyol.

2. The article with an organic-inorganic composite film according to claim 1, wherein
   the poorly water-soluble polymer includes a polymer having a solubility of 1.0 g or less with respect to 100 g of water at 25° C.

3. The article with an organic-inorganic composite film according to claim 1, wherein
   the poorly water-soluble polymer is free from fluorine.

4. The article with an organic-inorganic composite film according to claim 1, wherein
   the organic-inorganic composite film is obtained by applying a solution that contains tetraalkoxysilane as silicon alkoxide to the substrate and drying the solution.

5. The article with an organic-inorganic composite film according to claim 1, wherein
   the substrate is a resin sheet that is formed with a primer layer on its surface, and the organic-inorganic composite film is formed on the surface of the primer layer.

6. The article with an organic-inorganic composite film according to claim 5, wherein
   the primer layer is obtained by applying a solution containing 3-aminopropyl triethoxysilane as silicon alkoxide to the resin sheet and drying the solution.

7. The article with an organic-inorganic composite film according to claim 1, wherein
   the substrate is a glass sheet.

* * * * *